(12) United States Patent
Sekine et al.

(10) Patent No.: US 9,219,519 B2
(45) Date of Patent: Dec. 22, 2015

(54) PROXIMITY WIRELESS TRANSMISSION/RECEPTION DEVICE

(71) Applicant: Kabushiki Kaisha Toshiba, Minato-ku, Tokyo (JP)

(72) Inventors: Tsuyoshi Sekine, Kanagawa (JP); Fumio Okuno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/199,694

(22) Filed: Mar. 6, 2014

(65) Prior Publication Data
US 2015/0038082 A1 Feb. 5, 2015

(30) Foreign Application Priority Data
Aug. 1, 2013 (JP) .................. 2013-160538

(51) Int. Cl.
H04B 7/00 (2006.01)
H04B 1/44 (2006.01)

(52) U.S. Cl.
CPC ........................................ *H04B 1/44* (2013.01)

(58) Field of Classification Search
CPC ..... H04W 84/18; H04W 88/06; H04W 76/02; H04W 48/18; H04B 1/406; H04B 1/005; H04B 1/48; H04B 1/44; H04B 1/18
USPC ................ 455/41.2, 77, 78, 88, 550.1, 552.1, 455/553.1
See application file for complete search history.

(56) References Cited

U.S. PATENT DOCUMENTS

| 8,406,686 | B2 | 3/2013 | Tsushima et al. |
| 8,660,501 | B2 * | 2/2014 | Sanguinetti ..................... 455/78 |
| 2008/0113629 | A1 * | 5/2008 | Sato et al. ....................... 455/88 |

FOREIGN PATENT DOCUMENTS

| EP | 1865445 B1 | 8/2013 |
| JP | 2007-328634 B2 | 12/2007 |

\* cited by examiner

*Primary Examiner* — Nhan Le
(74) *Attorney, Agent, or Firm* — White & Case LLP

(57) ABSTRACT

A proximity wireless transmission/reception device of an embodiment includes a first transmission/reception unit, of a first communication scheme, including a first tuned circuit and a first modulation/demodulation circuit, a second transmission/reception unit, of a second communication scheme, including a second tuned circuit and a second modulation/demodulation circuit, an antenna where communication signals of the first and second communication schemes are induced, a switch unit configured to connect the antenna and the first transmission/reception unit or to connect the antenna and the second transmission/reception unit, a reception determination unit configured to determine reception states of the first and second transmission/reception units, and a switch switching unit configured to control the switch unit according to a determination result of the reception determination unit.

12 Claims, 5 Drawing Sheets

PROXIMITY WIRELESS TRANSMISSION/RECEPTION DEVICE

CROSS-REFERENCE TO RELATED APPLICATION

This application is based upon and claims the benefit of priority from the prior Japanese Patent Applications No. 2013-160538, filed on Aug. 1, 2013; the entire contents of which are incorporated herein by reference.

FIELD

Embodiments described herein relate generally to a proximity wireless transmission/reception device.

BACKGROUND

In recent years, portable information appliances such as mobile phones, wireless tags, and non-contact IC cards are becoming widespread. Electronic ticket gates, electronic money and the like are being introduced to computerize ticket gates and the like at stations by using a non-contact communication function of these information appliances.

As a near-field wireless communication technology that enables non-contact communication, ISO/IEC 14443 Type A and Type B are widespread especially in the United States of America and in Europe, and FeliCa (registered trademark) is widespread in Asia including Japan.

The NFC (Near Field Communication) forum puts together wireless communication protocols of Type A, Type B, and Type F (FeliCa scheme) as international standards, and a wireless communication LSI that realizes Type A/Type B/Type F by one chip is developed based on the standards. However, although Type F that is defined by the NFC is the same wireless communication technology as FeliCa, FeliCa is a technological scheme including application of an IC card, and a normal one-chip wireless communication LSI for Type A/Type B/Type F cannot provide a settlement service that uses FeliCa.

To realize a FeliCa function, a dedicated communication system LSI for FeliCa configured with a FeliCa wireless communication LSI and a FeliCa SE (secure element) LSI is necessary. The SE LSI is a security chip for safely processing data in services that use personal information, such as bank account settlement, payment of public transportation fares, and management of entering/leaving of a building.

To cope with the FeliCa settlement service in Japan, makers of mobile terminals provided with the non-contact communication function have to mount different LSIs for respective destinations of the mobile terminals, that is, a communication LSI for Type A/Type B or a communication system LSI for FeliCa, and there is an issue that extra cost, time and labor are caused.

When taking into account that, on a global basis, the communication system LSI for Type A/Type B is widespread, it is considered effective to configure a communication terminal that uses the existing communication system LSI for Type A/Type B while adding the FeliCa communication system LSI thereto, without developing a new terminal for handling the FeliCa settlement service.

However, in load modulation adopted by the non-contact communication, a null occurs where a change in a carrier amplitude may not be detected, depending on the communication distance. To avoid the occurrence of the null, adjustment of an antenna, adjustment of a tuning frequency, and the like have to be performed, and an antenna and a tuned circuit have to be provided as external circuits of chips separately for Type A/Type B and FeliCa, and the size of the device is increased.

DETAILED DESCRIPTION

According to an embodiment, a proximity wireless transmission/reception device includes a first transmission/reception unit, of a first communication scheme, including a first tuned circuit and a first modulation/demodulation circuit, a second transmission/reception unit, of a second communication scheme, including a second tuned circuit and a second modulation/demodulation circuit, an antenna where communication signals of the first and second communication schemes are induced, a switch unit configured to connect the antenna and the first transmission/reception unit or to connect the antenna and the second transmission/reception unit, a reception determination unit configured to determine reception states of the first and second transmission/reception units, and a switch switching unit configured to control the switch unit according to a determination result of the reception determination unit.

In the following, embodiments of the present invention will be described in detail with reference to the drawings.

First Embodiment

Figure 1:
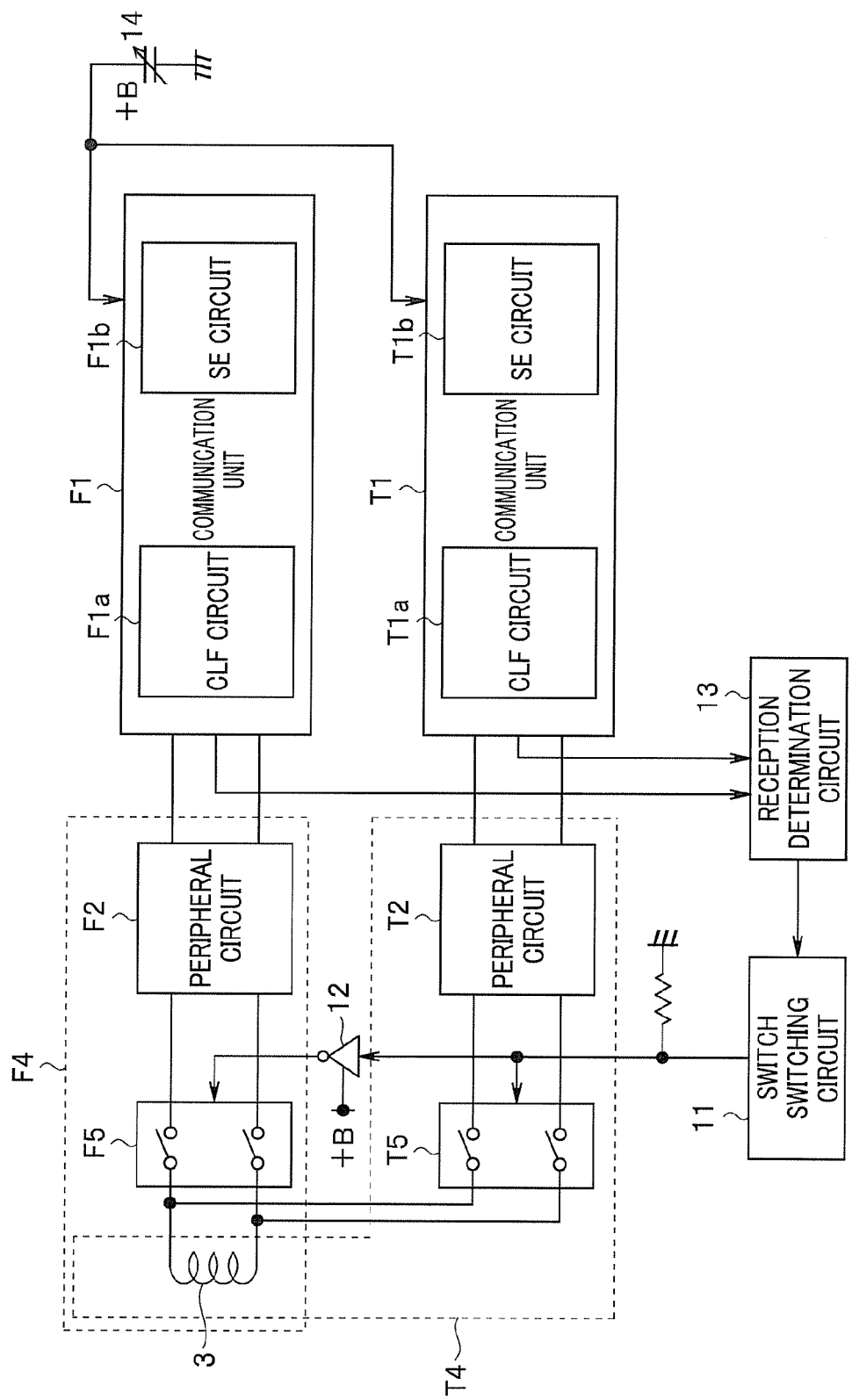
FIG. 1 is a block diagram showing a proximity wireless transmission/reception device according to a first embodiment of the present invention.

FIG. 1 is a block diagram showing a proximity wireless transmission/reception device according to a first embodiment of the present invention. The present embodiment describes an example of application to a transmission/reception device for FeliCa and for Type A/Type B, but application to a transmission/reception device of other communication scheme is also possible.

According to the present embodiment, miniaturization is attempted by sharing an antenna between external circuits for Type A/Type B and FeliCa.

In FIG. 1, a communication unit F1 for FeliCa communication and a communication unit T1 for Type A/Type B communication are both formed into LSIs, and may adopt existing LSI chip for FeliCa and LSI chip for Type A/Type B. A peripheral circuit F2 for FeliCa is connected to the communication unit F1 for FeliCa, and a peripheral circuit T2 for Type A/Type B is connected to the communication unit T1 for Type A/Type B.

An external circuit F4 for FeliCa is configured with the peripheral circuit F2 for FeliCa and an antenna 3, and an external circuit T4 for Type A/Type B is configured with the peripheral circuit T2 for Type A/Type B and the antenna 3, and the antenna 3 is shared.

To share the antenna 3, a switch IC F5 for FeliCa communication and a switch IC T5 for Type A/Type B communication are provided to the external circuit F4 for FeliCa and the external circuit T4 for Type A/Type B, respectively.

A high-frequency signal for FeliCa and a high-frequency signal for Type A/Type B are induced in the antenna 3. The high-frequency signal for FeliCa induced in the antenna 3 is supplied to the peripheral circuit F2 via the switch IC F5 for FeliCa communication, and the high-frequency signal for Type A/Type B induced in the antenna 3 is supplied to the peripheral circuit T2 via the switch IC T5 for Type A/Type B communication.

The peripheral circuits F2 and T2 are each configured with a tuned circuit, and receive the high-frequency signal for FeliCa or Type A/Type B. Also, load circuits for load modulation are configured in the peripheral circuits F2 and T2.

The communication unit F1 is configured with a CLF (contactless front-end) circuit F1a and an SE (secure element) circuit F1b for FeliCa. Also, the communication unit T1 is configured with a CLF circuit T1a and an SE circuit T1b for Type A/Type B.

The CLF circuits F1a and T1a enable non-contact communication via the peripheral circuits F2 and T2, respectively, and perform RF demodulation process on signals from the peripheral circuits F2 and T2 by envelope detection, for example, and also, perform transmission process by load modulation by controlling the load circuits of the peripheral circuits F2 and T2.

The SE circuit F1b performs a decoding process on a received signal from the CLF circuit F1a and stores data in a memory, not shown, and also, performs an encryption process on transmission information stored in the memory and outputs the same to the CLF circuit F1a. Also, the SE circuit T1b performs a decoding process on a received signal from the CLF circuit T1a, and also, performs an encryption process on a transmission signal and outputs the same to the CLF circuit T1a.

Note that the communication units F1 and T1 may be connected to a host computer, not shown. The host computer is capable of reading information stored in the memories of the SE circuits F1b and T1b. Also, the device in FIG. 1 not only functions as a non-contact IC card, but may also function as a reader/writer. In this case, the CLF circuits F1a and T1a of the communication units F1 and T1 are controlled by the host computer to perform reading and writing of data.

As described above, in the present embodiment, the antenna 3 is shared for FeliCa use and Type A/Type B use, and to enable highly accurate tuned operation of the peripheral circuits F2 and T2, the circuit for FeliCa and the circuit for Type A/Type B have to be separated. The switch ICs F5 and T5 are provided for this separation, and when the switch IC F5 is turned on, the antenna 3 functions for FeliCa communication, and when the switch IC T5 is turned on, the antenna 3 functions for Type A/Type B communication.

The switch switching circuit 11 outputs a switching signal for switching between on and off of the switch ICs F5 and T5. This switching signal is supplied directly to the switch IC T5, and is provided to the switch IC F5 after being inverted by an inverter 12. With this switching signal, the switch ICs F5 and T5 are configured such that when one is on, the other is off. In the case where the switch IC F5 is turned on by the switching signal, the antenna 3 is connected to the peripheral circuit F2, and the function for FeliCa is realized. On the other hand, in the case where the switch IC T5 is on, the antenna 3 is connected to the peripheral circuit T2, and the function for Type A/Type B is realized.

In the present embodiment, the switch switching circuit 11 controls the switch ICs F5 and T5 based on an output of a reception determination circuit 13, and turns on the switch IC F5 in the case where a FeliCa function is to be realized, and turns on the switch IC T5 in the case where a Type A/Type B function is to be realized.

Recognition signals are input to the reception determination circuit 13 from the communication units F1 and T1. In the case it is detected that a recognition signal (a preamble or the like) included in a FeliCa signal is included in a signal obtained by the demodulation process by the CLF circuit F1a, the communication unit F1 for FeliCa sets a bit indicating that a FeliCa signal is received to a logical value "1". In the present embodiment, a signal of a logical value "1" is supplied to the reception determination circuit 13 as the recognition signal. In the same manner, the communication unit T1 for Type A/Type B also supplies a recognition signal indicating that a Type A/Type B signal is received to the reception determination circuit 13 in the case it is detected, as a result of RF demodulation process, that a Type A/Type B signal is received. The reception determination circuit 13 determines, based on the recognition signal, which of the FeliCa signal and the Type A/Type B signal is received, or whether it is a no-signal state, and outputs a determination result to the switch switching circuit 11.

The switch switching circuit 11 performs switching control with respect to the switch ICs F5 and T5 at a predetermined timing to thereby enable reception of both the FeliCa signal and the Type A/Type B signal in a time-division manner, and also, in the case the determination result of the reception determination circuit 13 indicates that one of the FeliCa signal and the Type A/Type B signal is being received, the switch switching circuit 11 performs switching control with respect to the switch ICs F5 and T5 such that communication of the signal being received is continued.

Note that power supply voltage is supplied to the communication units F1 and T1 by a power source unit 14.

Figure 2:
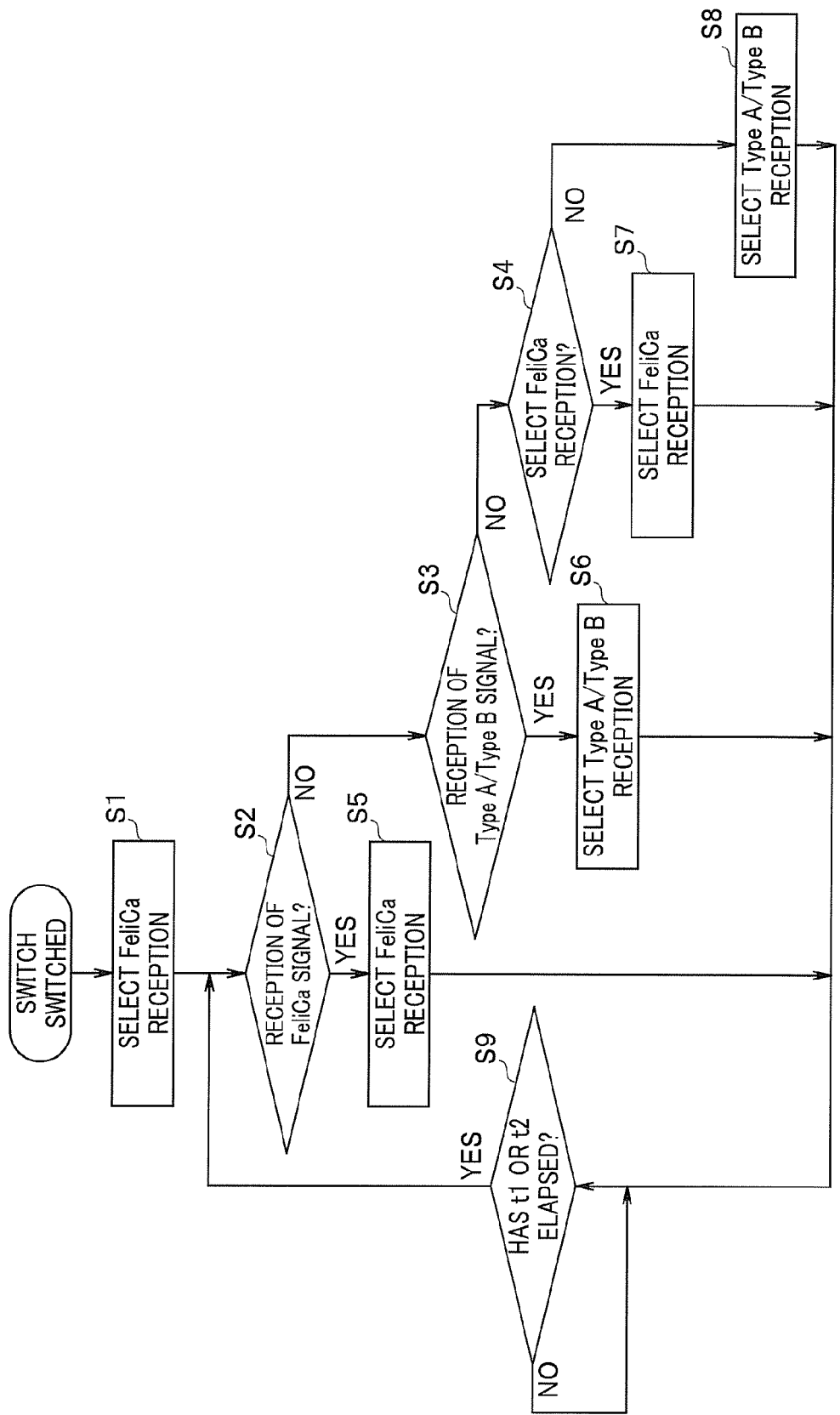
FIG. 2 is a flowchart for describing an operation of the first embodiment.
Figure 3:
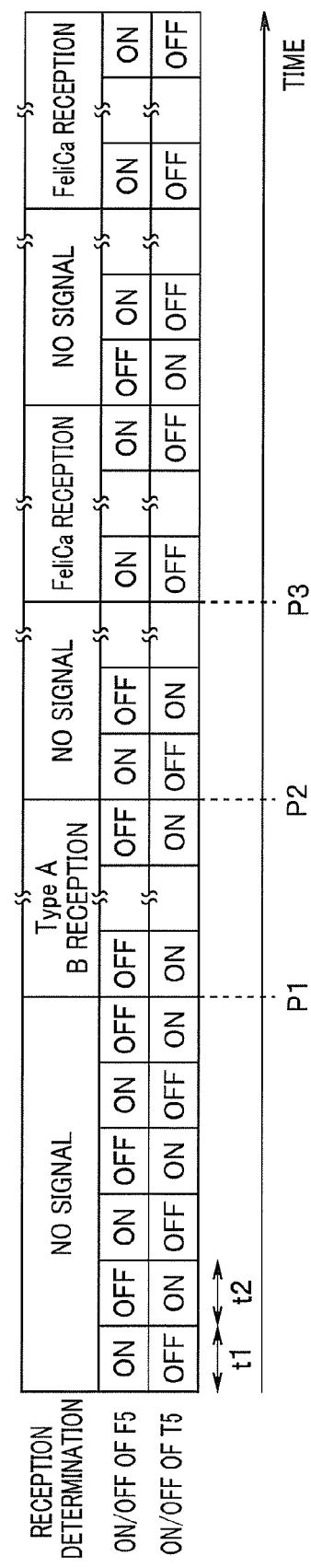
FIG. 3 is an explanatory diagram for describing an operation of a switch switching circuit 11.

Next, an operation of the embodiment configured in the manner described above is described with reference to FIGS. 2 and 3. FIG. 2 is a flowchart for describing an operation of the first embodiment, and FIG. 3 is an explanatory diagram for describing an operation of the switch switching circuit 11.

In step S1 in FIG. 2, one of the switch ICs is selectively set to on by the switch switching circuit 11. In the example in FIG. 2, first, the switch IC F5 for FeliCa signal communication is selected. In a next step S2, whether a FeliCa signal is being received or not is determined.

When the CLF circuits F1a and T1a of the communication units F1 and T1 receive a FeliCa signal and a Type A/Type B signal, respectively, the CLF circuits F1a and T1a output recognition signals to the reception determination circuit 13. When a recognition signal is received from the communication unit F1, the reception determination circuit 13 outputs a determination result indicating that a FeliCa signal is received, and when a recognition signal is received from the communication unit T1, the reception determination circuit 13 outputs a determination result indicating that a Type A/Type B signal is received.

The switch switching circuit 11 may determine, based on the determination result of the reception determination circuit 13, whether a FeliCa signal is received, a Type A/Type B is received, or no signal is received.

Here, it is assumed to be a period before a timing P1 in FIG. 3. In this case, a FeliCa signal and a Type A/Type B signal are not received, and NO determination is obtained in step S2 and step S3. Neither a FeliCa signal nor a Type A/Type B signal is received until the timing P1 in FIG. 3, and during this period, the process proceeds to step S4 and the switch IC which is currently set to on is determined.

For example, in the case where the switch IC F5 for FeliCa reception is on, the switch switching circuit 11 selectively turns on the switch IC F5 for FeliCa reception in step S7. Accordingly, reception of a FeliCa signal via the antenna 3 is enabled.

Determination of the switch switching circuit 11 for switching between the switch ICs F5 and T5 is performed in each time period t1 or t2, for example, as shown in FIG. 3. The time periods t1 and t2 are set to about 0.5 to 1 second, for example. When t1 or t2 elapses from the switching determination regarding the switch ICs F5 and T5, the process returns to step S2 from step S9, and whether a FeliCa signal is being received and whether a Type A/Type B signal is being received are sequentially determined in steps S2 and S3.

The no-signal state in FIG. 3 indicates that neither a FeliCa signal nor a Type A/Type B signal is being received, and the process proceeds from step S3 to step S4, and the switch switching circuit 11 selectively turns on the switch IC F5 for FeliCa reception in step S7. Thereafter, the processes of steps S2 to S9 are repeated, and when no signal is being received, switching of the switch ICs F5 and T5 is performed with an interval of the time period t1 or t2. Accordingly, when no signal is being received, switching to reception of a FeliCa signal and to reception of Type A/Type B is alternately performed.

Now, it is assumed that the device in FIG. 1 is brought into proximity with a region where reception of a Type A/Type B signal is enabled. Then, a recognition signal is output from the CLF circuit T1a of the communication unit T1, and the reception determination circuit 13 outputs a determination result indicating that a Type A/Type B signal is received to the switch switching circuit 11. The switch switching circuit 11 determines in step S3 that a Type A/Type B signal is being received, and turns on the switch IC T5 for Type A/Type B reception in step S6.

During reception of Type A/Type B signals, the switch switching circuit 11 performs determination of step S2, step S3 or step S4 in every time period t2. In the period from the timing P1 to a timing P2 in FIG. 3, Type A/Type B signals are being received, and in this period, the switch switching circuit 11 sets the switch IC T5 to on and sets the switch IC F5 to off. Accordingly, Type A/Type B signals are continuously received.

The communication unit T1 performs a demodulation process and a decoding process on a received signal. Also, the communication unit T1 encrypts information stored in the memory, and transmits necessary information from the antenna 3 to a transmission source of the Type A/Type B signal by load modulation by the CLF circuit T1a.

Now, it is assumed that the device in FIG. 1 is moved away from the region where reception of a Type A/Type B signal is enabled. Then, output of a recognition signal from the CLF circuit T1a of the communication unit T1 is stopped, and the reception determination circuit 13 outputs a determination result indicating that a Type A/Type B signal is no longer received to the switch switching circuit 11. For example, the period from the timing P2 to a timing P3 in FIG. 3 is a no-signal state, and a determination result indicating that neither a Type A/Type B signal nor a FeliCa signal is being received is output from the reception determination circuit 13.

Then, the switch switching circuit 11 alternately turns on the switch ICs F5 and T5 in every time period t1 or t2 by steps S4, S7, S8 and S9. In this manner, when no signal is being received, switching to reception of a FeliCa signal and to reception of Type A/Type B is alternately performed.

Next, it is assumed that the device in FIG. 1 is brought into proximity with a region where reception of a FeliCa signal is enabled. Then, a recognition signal is output from the CLF circuit F1a of the communication unit F1, and the reception determination circuit 13 outputs a determination result indicating that a FeliCa signal is received to the switch switching circuit 11. The switch switching circuit 11 determines in step S2 that a FeliCa signal is being received, and turns on the switch IC F5 for reception of a FeliCa signal in step S5.

During reception of FeliCa signals, the switch switching circuit 11 performs determination of step S2, step S3 or step S4 in every time period t1. In a predetermined period from the timing P3 in FIG. 3, FeliCa signals are being received, and in this period, the switch switching circuit 11 sets the switch IC F5 to on and sets the switch IC T5 to off. Accordingly, FeliCa signals are continuously received.

The communication unit F1 performs a demodulation process and a decoding process on a received signal. Also, the communication unit F1 encrypts information stored in the memory, and transmits necessary information from the antenna 3 to a transmission source of the FeliCa signal by load modulation by the CLF circuit F1a.

Then, steps S2 to S9 are repeated, and the switch IC F5 for FeliCa communication or the switch IC T5 for Type A/Type B communication is selected depending on the reception state, and transmission/reception of FeliCa signals and Type A/Type B signals is performed while sharing the antenna 3.

Note that by appropriately setting the time periods t1 and t2 for switching determination by the switch switching circuit 11, a response speed according to a request from the system may be realized.

It is also possible to control on and off of power source voltage that is supplied by the power source unit 14 to the communication units F1 and T1 by using a switching signal from the switch switching circuit 11. For example, power supply to the communication unit F1 or T1 for a signal not being received may be controlled to stop to suppress power consumption.

As described, according to the present embodiment, the antenna is shared by the circuit for FeliCa communication and the circuit for Type A/Type B communication, and on of the switch IC for FeliCa communication and on of the switch IC for Type A/Type B communication is switched to thereby allow alternate reception of FeliCa signals and Type A/Type B signals, and also, in the case where "during reception" is indicated by a recognition signal for checking reception from a communication unit, the switch IC for receiving the signal being received is fixed to on. Transmission/reception of FeliCa signals and transmission/reception of Type A/Type B signals are thereby enabled also in the case where the antenna is shared.

Second Embodiment

Figure 4:
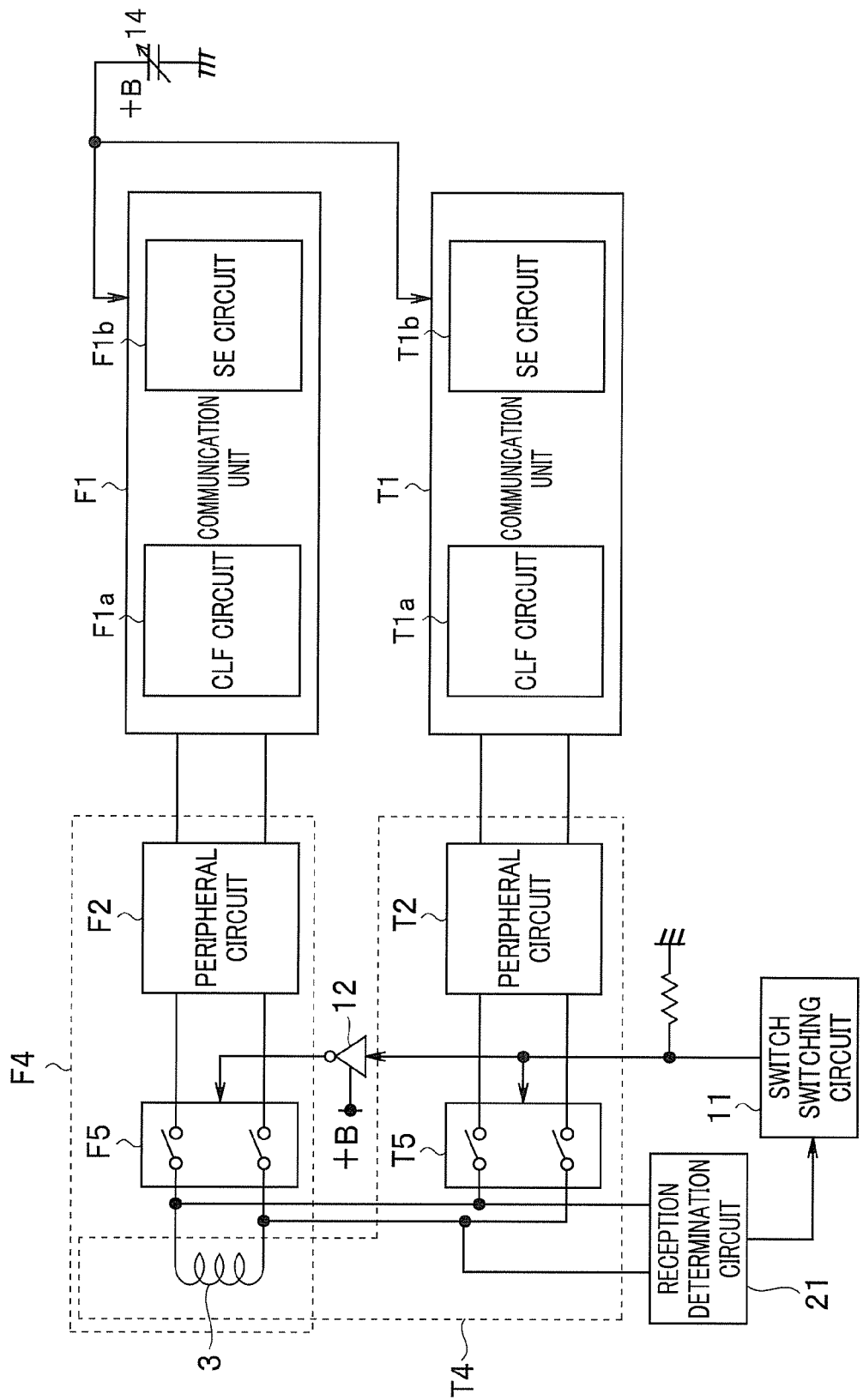
FIG. 4 is a block diagram showing a proximity wireless transmission/reception device according to a second embodiment of the present invention.

FIG. 4 is a block diagram showing a proximity wireless transmission/reception device according to a second embodiment of the present invention. In FIG. 4, components same as those in FIG. 1 are denoted with the same reference signs, and description thereof will be omitted.

Chips for performing proximity wireless transmission/reception may include, in addition to a chip capable of outputting a recognition signal, such as the LSI for FeliCa, a chip which is not capable of outputting such a recognition signal. The present embodiment allows sharing of an antenna also in such a case.

The present embodiment is different from the first embodiment in that a reception determination circuit 21 is adopted instead of the reception determination circuit 13. The reception determination circuit 21 is connected to the antenna 3, and includes a function of detecting a carrier induced in the antenna 3, and a function of detecting reception of a signal of one of the two communication schemes.

For example, in the case an RF demodulation process of a FeliCa signal is possible, and inclusion of a preamble which is included in a FeliCa signal in a signal obtained by the demodulation process is detected, the reception determination circuit 21 determines that a FeliCa signal is being received by the antenna 3. Also, in the case a carrier induced in the antenna 3 is detected, but reception of a FeliCa signal is not detected, the reception determination circuit 21 determines that a Type A/Type B signal is being received. Also, in the case induction of a carrier in the antenna 3 cannot be detected, the reception determination circuit 21 determines that neither a FeliCa signal nor a Type A/Type B signal is being received. The reception determination circuit 21 outputs the reception determination result to the switch switching circuit 11.

According to the embodiment configured in the manner described above, whether a FeliCa signal is being received by the antenna 3, or a Type A/Type B signal is being received, or it is a no-signal state where neither of the signals is being received is determined by the reception determination circuit 21. The reception determination circuit 21 outputs a determination result to the switch switching circuit 11.

The switch switching circuit 11 operates in the same manner as in the first embodiment. That is, in a no-signal state, the switch ICs F5 and T5 are alternately turned on, and during reception of one of the signals, the switch IC for receiving the signal is maintained to be on. Accordingly, also in the present embodiment, reception of a FeliCa signal and of a Type A/Type B signal is possible while sharing the antenna 3.

Accordingly, the present embodiment may obtain the same effect as that of the first embodiment. Also, in the present embodiment, a signal being received may be determined even in a case where a recognition signal for checking reception is not output from the LSI for communication.

Third Embodiment

Figure 5:
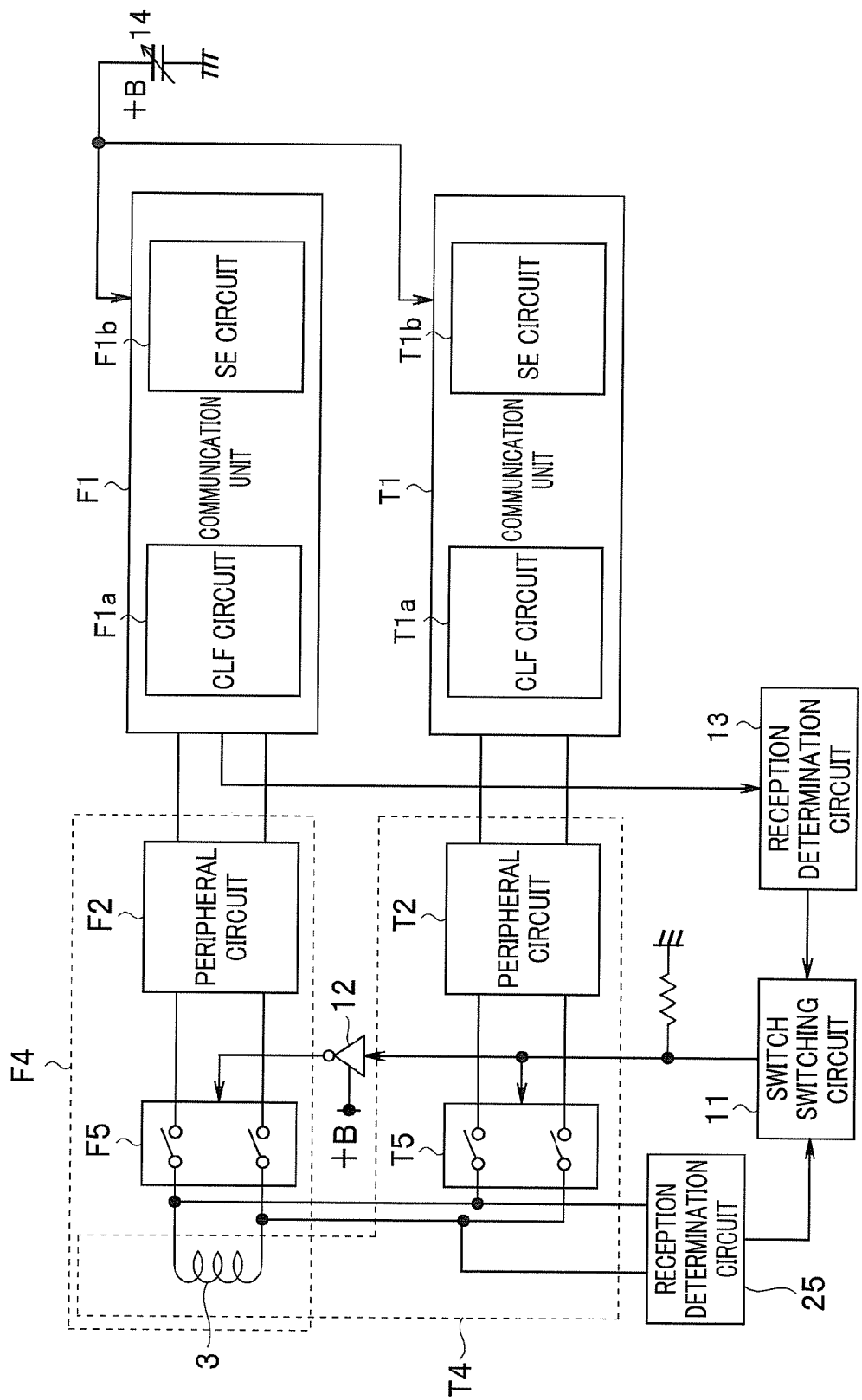
FIG. 5 is a block diagram showing a proximity wireless transmission/reception device according to a third embodiment of the present invention.

FIG. 5 is a block diagram showing a proximity wireless transmission/reception device according to a third embodiment. In FIG. 5, components same as those in FIG. 1 are denoted with the same reference signs, and description thereof will be omitted.

In the second embodiment, an example is described according to which recognition signals are not output from the LSIs for two types of communication. The present embodiment describes an example where a recognition signal is obtained from one of the LSIs for two types of communication.

In the example in FIG. 5, a recognition signal is given to the reception determination circuit 13 only from the communication unit F1 of the communication units F1 and T1. The reception determination circuit 13 outputs a determination result indicating whether a FeliCa signal is being received to the switch switching circuit 11 by the recognition signal.

A reception determination circuit 25 is connected to the antenna 3, and includes a function of detecting a carrier induced in the antenna 3. The reception determination circuit 25 outputs a determination result indicating whether a carrier is induced in the antenna 3 to the switch switching circuit 11.

The switch switching circuit 11 determines whether a FeliCa signal is being received or not based on the determination result of the reception determination circuit 13. Also, in the case where induction of a carrier in the antenna 3 is indicated by the reception determination circuit 25, and a determination result that a FeliCa signal is not being received is output from the reception determination circuit 13, the switch switching circuit 11 determines that a Type A/Type B signal is being received. Moreover, in the case where induction of a carrier in the antenna 3 is not detected by the reception determination circuit 25, the switch switching circuit 11 determines that neither a FeliCa signal nor a Type A/Type B signal is being received.

In the embodiment configured in the manner described above, the switch switching circuit 11 determines, based on the determination results of the reception determination circuits 13 and 25, whether a FeliCa signal is being received by the antenna 3, or a Type A/Type B signal is being received, or it is a no-signal state where neither of the signals is being received.

The switch switching circuit 11 operates in the same manner as in the first embodiment. That is, in a no-signal state, the switch ICs F5 and T5 are alternately turned on, and during reception of one of the signals, the switch IC for receiving the signal is maintained to be on. Accordingly, also in the present embodiment, reception of a FeliCa signal and of a Type A/Type B signal is possible while sharing the antenna 3.

Accordingly, the present embodiment may also obtain the same effect as that of the first embodiment. Also, in the present embodiment, a signal being received may be determined even in a case where a recognition signal for checking reception is not output from one of the LSIs for communication. Moreover, since the reception determination circuits 13 and 25 do not have to perform the demodulation processes of respective communication schemes, the circuit scales thereof may be made smaller compared to the reception determination circuit 21.

In this manner, in each of the embodiments described above, a proximity wireless transmission/reception device that realizes a system for Type A/Type B, in addition to mobile FeliCa, by the same circuit may be realized. With a relatively simple configuration of adding a reception determination circuit, a switch switching circuit and a switch IC, existing design resources for FeliCa and for Type A/Type B may be inherited. Also, only the antenna is shared by the external circuits, and properties equivalent as those of a single chip may be realized by a FeliCa chip and a Type A/Type B chip without the properties of the chips interfering with each other. Moreover, by adjusting the time period for switching on and off of the switch, a system response speed optimal for a request from a client may be realized. Still further, by controlling on and off of power of an unnecessary LSI at the same time, the power consumption of the system may be suppressed.

Note that in each of the embodiments described above, an example of configuring a circuit for receiving a FeliCa signal and a Type A/Type B signal is described, but application to other communication schemes is also possible, and application to not only two types of communication schemes, but also to three or more types of communication schemes is also possible.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A proximity wireless transmission/reception device comprising:
    a first transmission/reception unit, of a first communication scheme, including a first tuned circuit and a first modulation/demodulation circuit;
    a second transmission/reception unit, of a second communication scheme, including a second tuned circuit and a second modulation/demodulation circuit;
    an antenna where communication signals of the first and second communication schemes are induced;
    a switch unit configured to connect the antenna and the first transmission/reception unit or to connect the antenna and the second transmission/reception unit;
    a reception determination unit configured to determine reception states of the first and second transmission/reception units; and
    a switch switching unit configured to control the switch unit according to a determination result of the reception determination unit,
    wherein in a case of a no-signal state with respect to the communication signals of the first and second communication schemes, the switch switching unit connects the antenna and the first or second transmission/reception unit while switching between the first and second transmission/reception units in a predetermined time period, and in a case of a receiving state of one of the communication signals of the first and second communication schemes in the first or second transmission/reception unit, the switch switching unit connects the antenna and the first or second transmission/reception unit currently performing reception.

2. The proximity wireless transmission/reception device according to claim 1, wherein the reception determination unit determines the reception states of the first and second transmission/reception units by being connected to the antenna, and by detecting a carrier induced in the antenna and detecting that one of the communication signals of the first and second communication schemes is received.

3. The proximity wireless transmission/reception device according to claim 1, wherein the reception determination unit determines the reception states of the first and second transmission/reception units by being connected to the antenna and detecting a carrier induced in the antenna, and by receiving a recognition signal indicating that the communication signal of the first or second communication scheme is received, from one of the first and second modulation/demodulation circuits.

4. The proximity wireless transmission/reception device according to claim 1, wherein the reception determination unit determines the reception states of the first and second transmission/reception units by receiving recognition signals indicating that the communication signal of the first or second communication scheme is received, from the first and second modulation/demodulation circuits.

5. The proximity wireless transmission/reception device according to claim 1,
    wherein the switch unit includes
    a first switch configured to connect between the antenna and the first tuned circuit, and
    a second switch configured to be on during an off period of the first switch, and to connect between the antenna and the second tuned circuit.

6. The proximity wireless transmission/reception device according to claim 1, wherein the reception determination unit performs determination of the reception states by being provided, by the first transmission/reception unit, with a recognition signal indicating reception of the communication signal of the first communication scheme and by being provided, by the second transmission/reception unit, with a recognition signal indicating reception of the communication signal of the second communication scheme.

7. The proximity wireless transmission/reception device according to claim 1, wherein the reception determination unit determines the reception states of the first and second transmission/reception units by being connected to the antenna, and by detecting a carrier induced in the antenna and detecting that one of the communication signals of the first and second communication schemes is received.

8. The proximity wireless transmission/reception device according to claim 1, wherein the reception determination unit determines the reception states of the first and second transmission/reception units by being connected to the antenna and detecting a carrier induced in the antenna, and by receiving a recognition signal indicating that the communication signal of the first or second communication scheme is received, from one of the first and second modulation/demodulation circuits.

9. A proximity wireless transmission/reception device comprising:
    a first transmission/reception unit, of a first communication scheme, including a first tuned circuit and a first modulation/demodulation circuit;
    a second transmission/reception unit, of a second communication scheme, including a second tuned circuit and a second modulation/demodulation circuit;
    an antenna where communication signals of the first and second communication schemes are induced;
    a switch unit configured to connect the antenna and the first transmission/reception unit or to connect the antenna and the second transmission/reception unit;
    a reception determination unit configured to determine reception states of the first and second transmission/reception units; and
    a switch switching unit configured to control the switch unit according to a determination result of the reception determination unit, wherein the reception determination unit determines the reception states of the first and second transmission/reception units by receiving recognition signals indicating reception of a communication signal of the first or second communication scheme, from the first and second modulation/demodulation circuits.

10. A proximity wireless transmission/reception device comprising:
    a first transmission/reception unit, of a first communication scheme, including a first tuned circuit and a first modulation/demodulation circuit;
    a second transmission/reception unit, of a second communication scheme, including a second tuned circuit and a second modulation/demodulation circuit;
    an antenna where communication signals of the first and second communication schemes are induced;
    a switch unit configured to connect the antenna and the first transmission/reception unit or to connect the antenna and the second transmission/reception unit;
    a reception determination unit configured to determine reception states of the first and second transmission/reception units; and a switch switching unit configured to control the switch unit according to a determination result of the reception determination unit, wherein the reception determination unit performs determination of the reception states by being provided, by the first transmission/reception unit, with a recognition signal indicating reception of the communication signal of the first communication scheme and by being provided, by the second transmission/reception unit, with a recognition signal indicating reception of the communication signal of the second communication scheme.

11. A proximity wireless transmission/reception method comprising:

alternately placing a first transmission/reception unit, of a first communication scheme, including a first tuned circuit and a first modulation/demodulation circuit and a second transmission/reception unit, of a second communication scheme, including a second tuned circuit and a second modulation/demodulation circuit in a reception enabled state by controlling switching of a switch unit configured to connect the first transmission/reception unit and an antenna or to connect the second transmission/reception unit and the antenna;

determining reception states of the first and second transmission/reception units; and continuously connecting a transmission/reception unit in a receiving state, of the first and second transmission/reception units, and the antenna, based on a determination result regarding the reception states, wherein the reception states of the first and second transmission/reception units are determined by receiving recognition signals indicating that a communication signal of the first or second communication scheme is received, from the first and second modulation/demodulation circuits.

12. A proximity wireless transmission/reception method comprising:

alternately placing a first transmission/reception unit, of a first communication scheme, including a first tuned circuit and a first modulation/demodulation circuit and a second transmission/reception unit, of a second communication scheme, including a second tuned circuit and a second modulation/demodulation circuit in a reception enabled state by controlling switching of a switch unit configured to connect the first transmission/reception unit and an antenna or to connect the second transmission/reception unit and the antenna;

determining reception states of the first and second transmission/reception units; and based on a determination result regarding the reception states, in a case of a no-signal state with respect to the communication signals of the first and second communication schemes, connecting the antenna and the first or second transmission/reception unit while switching between the first and second transmission/reception units in a predetermined time period, and in a case of a receiving state of one of the communication signals of the first and second communication schemes in the first or second transmission/reception unit, connecting the antenna and the first or second transmission/reception unit currently performing reception.

* * * * *